(12) United States Patent
Matsushita

(10) Patent No.: US 11,358,592 B2
(45) Date of Patent: Jun. 14, 2022

(54) IN-VEHICLE PROCESSING APPARATUS AND IN-VEHICLE PROCESSING SYSTEM

(71) Applicant: CLARION CO., LTD., Saitama (JP)

(72) Inventor: Yuki Matsushita, Saitama (JP)

(73) Assignee: CLARION CO., LTD., Saitama (JP)

( * ) Notice: Subject to any disclaimer, the term of this patent is extended or adjusted under 35 U.S.C. 154(b) by 0 days.

(21) Appl. No.: 16/952,326

(22) Filed: Nov. 19, 2020

(65) Prior Publication Data

US 2021/0197800 A1 Jul. 1, 2021

(30) Foreign Application Priority Data

Dec. 26, 2019 (JP) .............................. JP2019-235571

(51) Int. Cl.
| | | |
|---|---|---|
| *B60Q 1/48* | (2006.01) | |
| *B60W 30/06* | (2006.01) | |
| *G08G 1/14* | (2006.01) | |
| *G06V 20/10* | (2022.01) | |
| *G06V 20/58* | (2022.01) | |

(52) U.S. Cl.
CPC ........... *B60W 30/06* (2013.01); *G06V 20/182* (2022.01); *G06V 20/586* (2022.01); *G08G 1/142* (2013.01); *G08G 1/144* (2013.01)

(58) Field of Classification Search
CPC .............. B60W 30/06; G06K 9/00651; G06K 9/00812; G08G 1/142; G08G 1/144; G01C 21/3685; B62D 15/0285; G06V 20/182; G06V 20/586
USPC ............................... 340/932.2, 937, 988, 990
See application file for complete search history.

(56) References Cited

U.S. PATENT DOCUMENTS

| | | | |
|---|---|---|---|
| 2012/0188100 A1 | 7/2012 | Min et al. | |
| 2015/0078624 A1* | 3/2015 | Fukuda | G08G 1/168 |
| | | | 382/104 |
| 2016/0144857 A1* | 5/2016 | Ohshima | G08G 1/04 |
| | | | 701/23 |
| 2016/0362103 A1 | 12/2016 | Büschenfeld et al. | |
| 2019/0039606 A1* | 2/2019 | Fujita | B60R 21/00 |
| 2019/0189011 A1* | 6/2019 | Yanagida | G08G 1/148 |

(Continued)

FOREIGN PATENT DOCUMENTS

| | | |
|---|---|---|
| KR | 2019-0084916 A | 7/2019 |
| WO | 2017/168754 A1 | 10/2017 |

OTHER PUBLICATIONS

Extended European Search Report mailed by European Patent Office dated Apr. 30, 2021 in corresponding European patent application No. 20208307.7-1009.

(Continued)

*Primary Examiner* — Anh V La
(74) *Attorney, Agent, or Firm* — IP Business Solutions, LLC

(57) ABSTRACT

An in-vehicle processing apparatus that executes control of causing a vehicle to perform automated traveling from a predetermined position to a parking space and causing the vehicle to perform automated entry into the parking space, is configured to include a notification control section that causes a portable electronic device carried by a user to display a parking position notification display in which a position of the parking space entered by the vehicle through the automated entry and the predetermined position are superimposed on an image.

4 Claims, 5 Drawing Sheets

(56) References Cited

U.S. PATENT DOCUMENTS

2020/0005641 A1   1/2020 Park
2020/0148197 A1*  5/2020 Yoon .................... B60W 30/06

OTHER PUBLICATIONS

European Office Action mailed by European Patent Office dated Mar. 24, 2022 in corresponding European patent application No. 20 208 307.7-1009.

* cited by examiner

IN-VEHICLE PROCESSING APPARATUS AND IN-VEHICLE PROCESSING SYSTEM

INCORPORATION BY REFERENCE

The present application claims priority under 35 U.S.C. § 119 to Japanese Patent Application No. 2019-235571 filed on Dec. 26, 2019. The content of the application is incorporated herein by reference in its entirety.

BACKGROUND OF THE INVENTION

Field of the Invention

The present invention relates to an in-vehicle processing apparatus and an in-vehicle processing system.

Description of the Related Art

Conventionally, there are techniques related to automated parking of a vehicle, and International Publication No. WO 2017168754 is one of such techniques. International Publication No. WO 2017168754 describes as follows: "The automatic parking system is equipped with: an automatic parking control device (10) for controlling automatic parking of a vehicle which has an automatic driving function; and a portable terminal (20) capable of communicating with the automatic parking control device (10). The automatic parking control device (10) searches for available parking spaces and transmits the search result to the portable terminal (20). Upon receiving the available parking space search result from the automatic parking control device (10), the portable terminal (20) transmits an instruction regarding selection of a parking space to the automatic parking control device (10) on the basis of an operation performed by a user. On the basis of the instruction received from the portable terminal (20), the automatic parking control device (10) selects a target parking space from among the detected available parking spaces and causes the vehicle to automatically park in the target parking space."

However, the technique of International Publication No. WO 2017168754 has the problem that it is difficult for the user to grasp a position of the parking space where the vehicle is parked.

An object of the present invention is to provide an in-vehicle processing apparatus and an in-vehicle processing system that enable a user to easily grasp a position where a vehicle is parked.

SUMMARY OF THE INVENTION

An aspect of the present invention is an in-vehicle processing apparatus that executes control of causing a vehicle to perform automated traveling from a predetermined position to a parking space and causing the vehicle to perform automated entry into the parking space, including a notification control section that causes a portable electronic device carried by a user to display a parking position notification display in which a position of the parking space entered by the vehicle through the automated entry and the predetermined position are superimposed on an image.

According to the present invention, a user can easily grasp a position where a vehicle is parked.

DETAILED DESCRIPTION OF THE PREFERRED EMBODIMENT

Hereinafter, an embodiment of the present invention will be described with reference to drawings.

Figure 1:
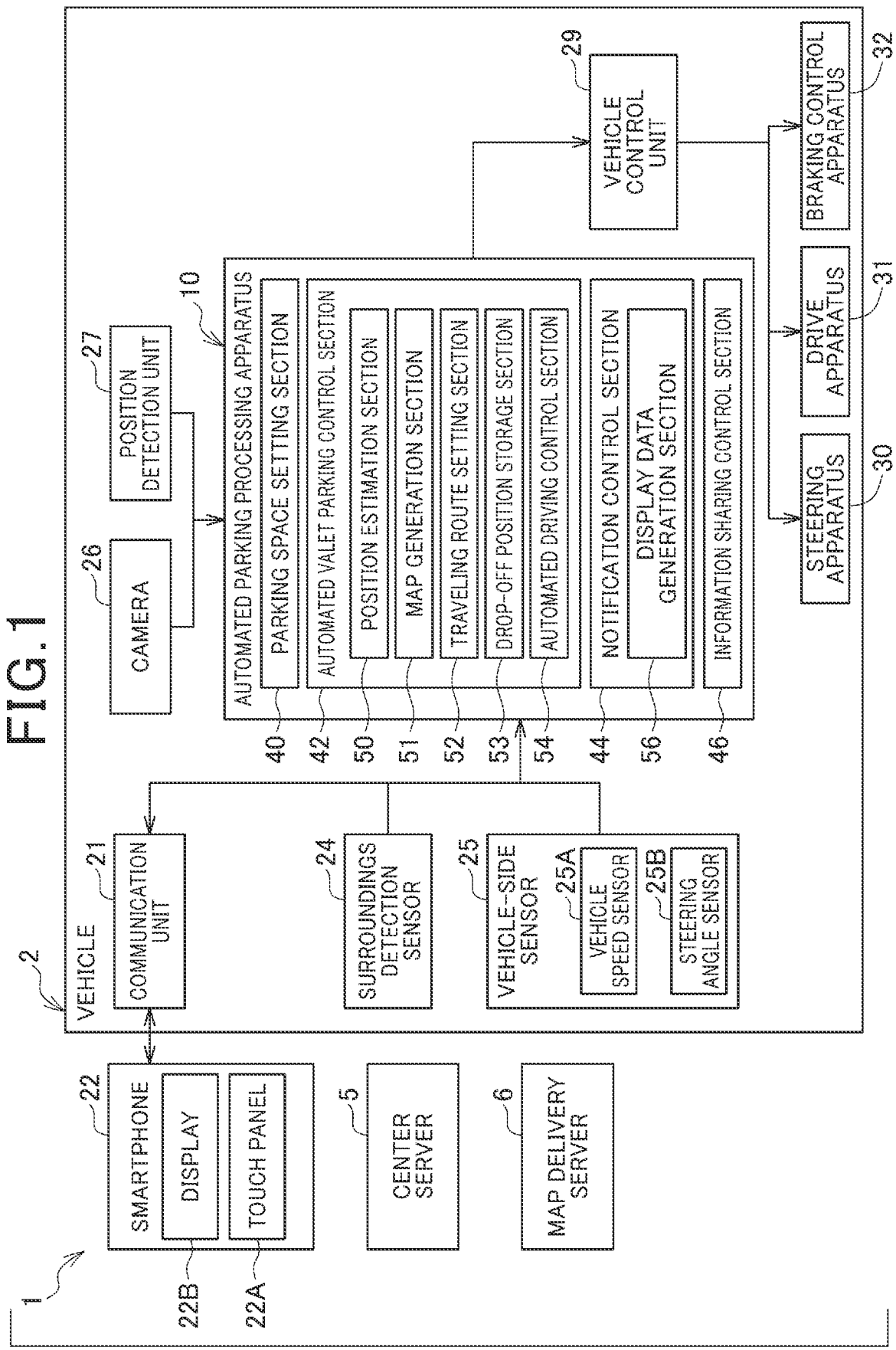
FIG. 1 shows an automated parking system including an automated parking processing apparatus according to an embodiment of the present invention.

FIG. 1 shows an automated parking system 1 including an automated parking processing apparatus 10 according to the present embodiment.

The automated parking system 1 is a system in which after an occupant gets out of a vehicle 2, the vehicle 2 performs automated traveling from a drop-off position (predetermined position) to a parking space and performs automated entry into the parking space. Moreover, the automated parking system 1 is a system in which in response to a call of the occupant, the vehicle 2 performs automated leaving of the parking space and performs automated traveling to a pick-up position where the occupant previously got out of the vehicle 2. The system is also referred to as so-called "automated valet parking system" and can be used for parking lots, parking spaces, and the like of facilities such as shopping malls, amusement parks, and airports. Note that "automated traveling", "automated entry", and "automated leaving" refer to causing the vehicle 2 to travel, to enter the parking space, and to leave the parking space, respectively, without the occupant performing driving operation. Although an example in a parking lot of a facility is described in the present embodiment, the present invention is also applicable to roadside parking spaces and the like.

The automated parking system 1 includes the automated parking processing apparatus 10 mounted in the vehicle 2, a smartphone 22 carried by the occupant (user), a center server 5 and a map delivery server 6 that communicate with the automated parking processing apparatus 10.

The smartphone 22 includes a wireless communication circuit that wirelessly communicates with the automated parking processing apparatus 10 from an outside of the vehicle 2. The smartphone 22 is an example of a portable electronic device that is capable of inputting an operation made by the user to the automated parking processing apparatus 10. The smartphone 22 includes a touch panel 22A as an operator that receives an operation made by the user (for example, the occupant of the vehicle 2), and a display 22B as a display section that displays various information. Note that the smartphone 22 may include a gesture detection section that detects a gesture, or the like, as the operator that receives an operation made by the user.

Each of the center server 5 and the map delivery server 6 is a computer that communicates with the automated parking processing apparatus 10 through a telecommunication circuit.

The center server 5 manages a status of entries of vehicles 2 in parking spaces. For example, the center server 5 manages a status of entries of vehicles 2 in parking spaces of a parking lot.

The map delivery server 6 stores a map 70 (FIG. 4) including at least a parking space, and data on an aerial photograph 72 (FIG. 5) including at least the parking space. The map delivery server 6 transmits the map 70 and the data on the aerial photograph 72 to the automated parking processing apparatus 10, in response to a request from the automated parking processing apparatus 10 of the vehicle 2.

The automated parking processing apparatus 10 is an in-vehicle apparatus that performs automated valet parking control. The automated valet parking control includes automated entry control and automated leaving control. The automated entry control is control of causing the vehicle 2 to automatically travel from a drop-off position of the occupant to a parking space and to complete automated entry into the parking space. The automated leaving control is control of causing the vehicle 2 to automatically leave the parking space and to automatically travel to the previous drop-off position. In the automated leaving control, a destination (predetermined position) of the vehicle 2 by the automated traveling may be a position designated by the user, or may be a position based on position information on the smartphone 22.

A communication unit 21, a surroundings detection sensor 24, a vehicle-side sensor 25, a camera 26, a position detection unit 27, and a vehicle control unit 29 are connected, through an in-vehicle network (for example, CAN or the like), or directly, to the automated parking processing apparatus 10.

The communication unit 21 includes a wireless communication circuit that relays communication between the automated parking processing apparatus 10 and each of the smartphone 22, the center server 5, and the map delivery server 6. For example, a TCU (Telematics Control Unit) is used for the communication unit 21.

The surroundings detection sensor 24 is one or more sensors that sense a position of an obstacle existing around the vehicle 2. Examples of the sensor include a sonar, a radar, and a lidar that can measure a distance to the obstacle by using sound waves, radio waves, electromagnetic waves, light, or the like, and a stereo camera and the like that can measure a distance to the obstacle by using parallax.

The vehicle-side sensor 25 is a collective term for sensors pre-included in the vehicle 2. The sensors related to the automated parking system 1 are a vehicle speed sensor 25A that senses a vehicle speed of the vehicle 2, and a steering angle sensor 25B that senses a steering angle of the vehicle 2.

The camera 26 functions as a shooting section that shoots surroundings of the vehicle 2 and, in the present embodiment, shoots entire surroundings (360 degrees) centered on the vehicle 2. The camera 26 includes, for example, four camera devices that shoot a front side of, a left side of, a right side of, and a rear side of the vehicle 2, respectively. The camera 26 may be a camera device that shoots all directions by using a single camera. The camera 26 may include any number of cameras that are required to sense the surroundings of the vehicle 2.

The position detection unit 27 is a unit that functions as a position detection section that detects a current position of the vehicle 2. The position detection unit 27 in the present embodiment includes a GNSS (Global Navigation Satellite System) receiver that receives a GNSS signal, and a processor that computes the current position based on the GNSS signal.

The vehicle control unit 29 is a unit that controls a steering apparatus 30, a drive apparatus 31, and a braking control apparatus 32 that are provided to the vehicle 2. The vehicle control unit 29 includes a computer (for example, ECU (Electronic Control Unit)) that executes such control.

The computer is connected, through the in-vehicle network (for example, CAN or the like), or directly, to the steering apparatus 30, the drive apparatus 31, and the braking control apparatus 32.

The steering apparatus 30 is an apparatus including an actuator that causes a steering wheel of the vehicle 2 to steer.

The drive apparatus 31 is an apparatus including an actuator that adjusts driving force of driving wheels of the vehicle 2. Such an actuator corresponds to a throttle actuator when a power source of the vehicle 2 is an engine, and corresponds to a motor when the power source is the motor.

The braking control apparatus 32 includes an actuator that controls braking force to be applied to wheels of the vehicle 2 by controlling a braking system provided to the vehicle 2, based on information from the automated parking processing apparatus 10.

The automated parking processing apparatus 10 includes a computer (ECU in the present embodiment) that includes a processor such as a CPU (Central Processing Unit) or an MPU (Microprocessor Unit), a memory device (also referred to as main storage device) such as a ROM (Read Only Memory) or a RAM (Random Access Memory), a storage device (also referred to as auxiliary storage device) such as an HDD (Hard Disk Drive) or an SSD (Solid State Drive), an interface circuit for connecting to sensors and peripheral equipment, and an in-vehicle network communication circuit that communicates with another in-vehicle apparatus via the in-vehicle network. In the automated parking processing apparatus 10, various functional components are implemented in such a manner that the processor executes a computer program stored in the memory device or the storage device.

As such functional components, the automated parking processing apparatus 10 includes a parking space setting section 40, an automated valet parking control section 42, a notification control section 44, and an information sharing control section 46.

The parking space setting section 40 sets a position of a parking space where the vehicle 2 is to be parked. Any scheme may be used to set the position of the parking space. For example, when available (that is, vacant) parking spaces are managed by the center server 5, the parking space setting section 40 may inquire of the center server 5 about a position of an available parking space, and set the position of the parking space based on a result of the inquiry. For example, the parking space setting section 40 may set the position of the parking space by detecting a position of an available parking space based on a result of detection by the surroundings detection sensor 24 and an image shot by the camera 26. For example, the parking space setting section 40 may set the position of the parking space that is designated by the user through operation of the smartphone 22.

The automated valet parking control section 42, which executes the above-mentioned automated valet parking control in response to user operation of the smartphone 22, includes a position estimation section 50, a map generation section 51, a traveling route setting section 52, a drop-off position storage section 53, and an automated driving control section 54.

The position estimation section 50 estimates a current position (own position) of the vehicle 2, based on a result of sensing by the vehicle-side sensor 25 and a result of detection by the position detection unit 27, by using a publicly known, or well-known, scheme for dead reckoning. In the dead reckoning, the own position is represented by using a two-dimensional local coordinate system that is set based on a position and a yawing angle of the vehicle 2. The position estimation section 50 generates a local coordinate system at least at a timing before entering a parking lot, and estimates a position of the vehicle 2 in the local coordinate system when estimating the own position. Note that coordinates of the local coordinate system are converted as appropriate into coordinates of an absolute coordinate system that uses a longitude and a latitude or the like by the position estimation section 50, by using a publicly known, or well-known, scheme.

The map generation section 51 generates map data in which an obstacle in a traveling route is recorded on the local coordinate system. The obstacle is an appropriate object that hinders or restricts traveling of the vehicle 2. Examples of the obstacle include constructions such as a pillar and a wall, markings such as a pole and a compartment line that demarcate a parking space from a vehicle traveling area, another vehicle, and the like. After the vehicle 2 enters the parking lot, the map generation section 51 sequentially records a trajectory of traveling of the vehicle 2 on the local coordinate system, based on the own positions estimated by the position estimation section 50. In addition, the map generation section 51 detects an obstacle around the vehicle 2, based on a result of detection by the surroundings detection sensor 24 and an image shot by the camera 26, and records a position of a point group that forms an outer shape of the obstacle on the local coordinate system. Thus, the map data is generated in which the trajectory of the traveling of the vehicle 2 from the parking space up to the drop-off position and the point group of the obstacle are presented by using coordinates of the local coordinate system.

The traveling route setting section 52 sets a traveling route between the drop-off position of the occupant and the parking space, based on the map data generated by the map generation section 51, the position of the parking space set by the parking space setting section 40, and the current positions estimated by the position estimation section 50.

The drop-off position storage section 53 stores a current position of the vehicle 2 when the occupant gets out of the vehicle, as the drop-off position. It can be detected that the occupant gets out of the vehicle, by using a publicly known, or well-known, appropriate technique. For example, it is assumed that the vehicle-side sensor 25 includes a door opening-closing sensor that senses opening and closing of a door of the vehicle 2, or a seat surface pressure sensor that senses pressure on a seat surface of a seat. In such a case, the automated valet parking control section 42 can detect that the occupant gets out of the vehicle, by sensing that the door of the vehicle 2 is opened, based on a sensing signal from the door opening-closing sensor. The automated valet parking control section 42 can detect that the occupant gets out of the vehicle, by sensing that pressure applied on the seat surface of the seat becomes absent, based on a sensing signal from the seat surface pressure sensor. When the automated valet parking control section 42 detects that the occupant gets out of the vehicle, the automated valet parking control section 42 stores the drop-off position in the drop-off position storage section 53, based on the current position of the vehicle 2.

The automated driving control section 54 generates control information for automated traveling, automated entry, and automated leaving, based on the traveling route set by the traveling route setting section 52, and outputs the control information to the vehicle control unit 29. Specifically, at a time of automated entry control that causes the vehicle 2 to automatically enter the parking space, the automated driving control section 54 generates control information related to automated traveling from the drop-off position to the parking space and automated entry into the parking space. At a time of automated leaving control that causes the vehicle 2 to leave the parking space, the automated driving control section 54 generates control information related to automated leaving of the parking space and automated traveling from the parking space to a pick-up position.

The vehicle control unit 29 executes control in accordance with such control information, whereby the vehicle 2 is automatically driven and operated, so that the vehicle accomplishes automated traveling, automated entry, and automated leaving.

The notification control section 44 controls operation for user notification. As one of the user notification, at least notification of information related to automated valet parking operation of the vehicle 2 is included. The information related to the automated valet parking operation is notified to the user in such a manner that the smartphone 22 displays, on the display 22B, an operation status display screen D that displays a status of the automated valet parking operation of the vehicle 2.

Figure 2:
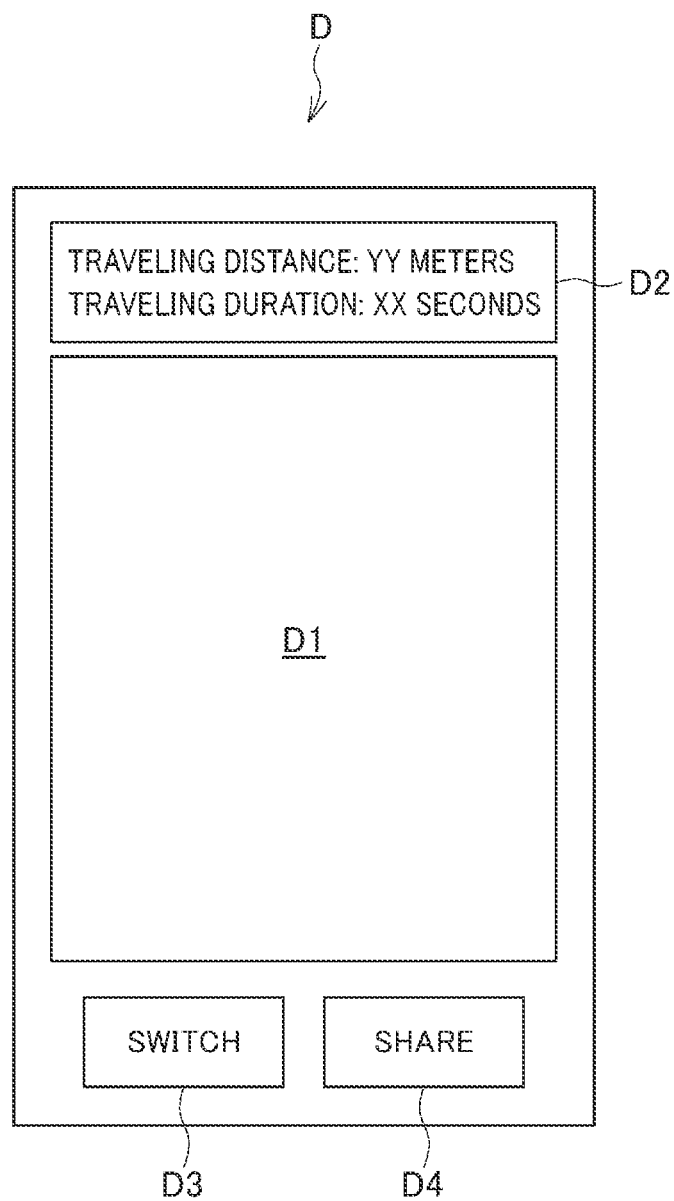
FIG. 2 schematically shows an example of an operation status display screen.

FIG. 2 schematically shows an example of the operation status display screen D.

As shown in FIG. 2, a parking position notification display D1, an automated traveling information display D2, a switch button D3, and a share button D4 are provided in the operation status display screen D.

The parking position notification display D1 is a display for notifying the user, by using any one of the map 70 and the aerial photograph 72, of a parking space entered by the vehicle 2 through automated entry and a drop-off position. Specific examples of the parking position notification display D1 will be described later.

The automated traveling information display D2 is a display for notifying the user of information related to automated traveling, and displays a traveling distance and a traveling duration traveled by the vehicle 2 in the automated traveling.

The switch button D3 and the share button D4 are operation buttons that can be operated by the user using the touch panel 22A.

The switch button D3 is operated when the user switches between the map 70 and the aerial photograph 72 used in the parking position notification display D1. When the switch button D3 is operated, the smartphone 22 transmits, to the automated parking processing apparatus 10, a switching command instructing that a switch be made from the map 70 to the aerial photograph 72, or from the aerial photograph 72 to the map 70.

The share button D4 is operated when the user shares, with another user (for example, a family member, a friend, an acquaintance, or the like), the position of the parking space entered by the vehicle 2 through automated entry. When the share button D4 is operated, the smartphone 22 transmits, to the automated parking processing apparatus 10, a sharing command instructing that the position of the parking space be shared.

In FIG. 1, the notification control section 44 includes a display data generation section 56 that generates display data for the smartphone 22 to display the operation status display screen D. The display data generation section 56 sequentially generates the display data on the operation status display screen D while the vehicle 2 is performing automated traveling, automated entry, and automated leaving. The display data generation section 56 transmits the display data to the smartphone 22 and causes the smartphone 22 to display the operation status display screen D.

When a sharing command from the smartphone 22 is received by the communication unit 21, the information sharing control section 46 executes control of allowing the user to share the position of the parking space entered by the vehicle 2 with another user.

In the present embodiment, sharing of parking space position information is performed by making it possible for a portable electronic device carried by the another user to receive the position of the parking space through an electronic mail or an appropriate SNS (Social Networking Service) app. In other words, the information sharing control section 46 transmits the position of the parking space to an electronic mail account or an SNS app account of the sharing-destination user, whereby the position of the parking space can be shared with the sharing-destination user. The information sharing control section 46 may acquire the account of the sharing-destination user from an input made by the user into the smartphone 22, or may be acquired from an address book stored in the smartphone 22.

Figure 3:
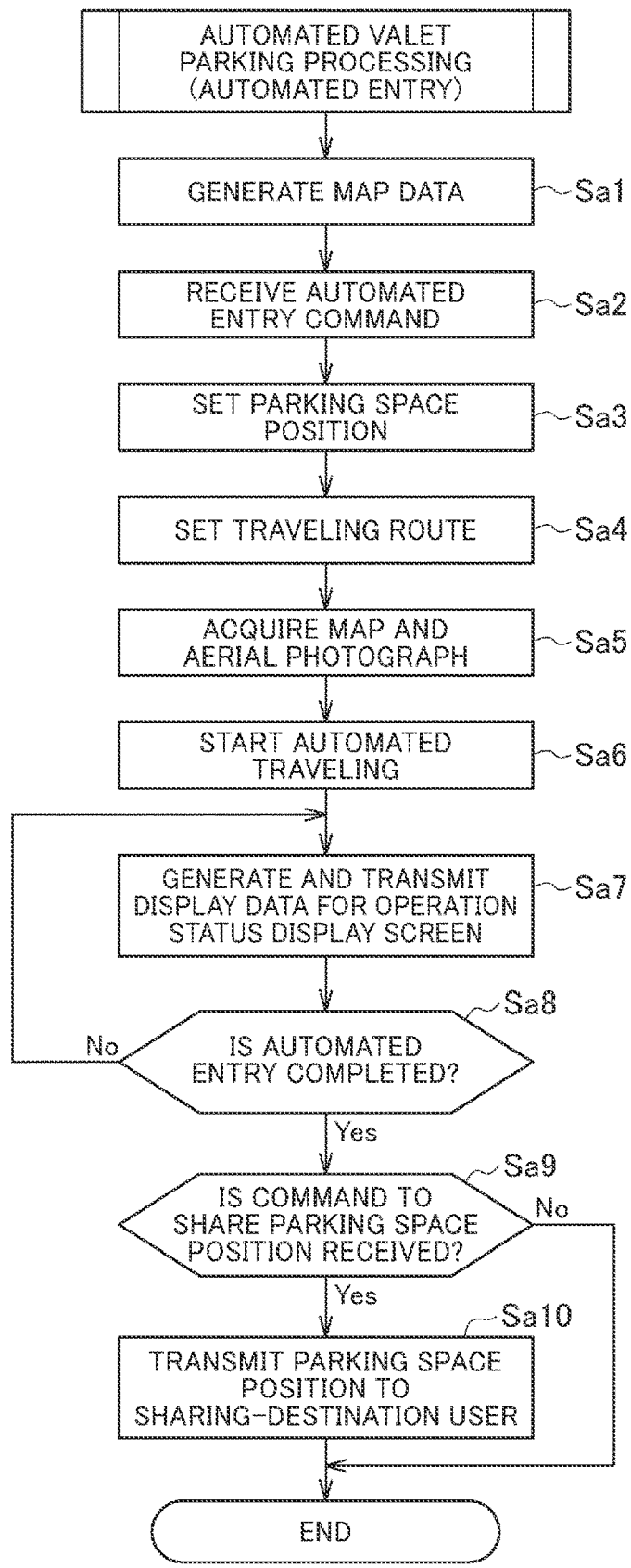
FIG. 3 is a flowchart of automated valet parking processing.

FIG. 3 is a flowchart of automated valet parking processing. Note that FIG. 3 shows the processing when the occupant causes the vehicle 2 to automatically enter a parking space in a parking lot.

When the vehicle 2 enters the parking lot through driving operation by a driver, at the automated parking processing apparatus 10, the map generation section 51 of the automated valet parking control section 42 sequentially generates map data (step Sa1). Note that the automated valet parking control section 42 may detect that the vehicle 2 has entered the parking lot, based on information acquired from a navigation system (not shown) included in the vehicle 2, or on an operation made by the user (occupant).

Subsequently, when the occupant gets out of the vehicle 2 in the parking lot and makes an operation on the smartphone 22 for instructing the vehicle 2 to perform automated entry, an automated entry command is transmitted from the smartphone 22 to the automated parking processing apparatus 10. When the automated entry command is received (step Sa2), the parking space setting section 40 sets a position of a parking space (step Sa3), and the traveling route setting section 52 sets a traveling route from a drop-off position (current position of the vehicle 2) to the parking space (step Sa4). The notification control section 44 acquires the map 70 and the data on the aerial photograph 72 from the map delivery server 6 (step Sa5).

The automated driving control section 54 generates control information for automated traveling and automated entry, based on the traveling route, and outputs the control information to the vehicle control unit 29, whereby the vehicle 2 starts automated traveling toward the parking space (step Sa6). When the automated traveling of the vehicle 2 is started, the notification control section 44 generates display data on the operation status display screen D, transmits the display data to the smartphone 22, and thus causes the smartphone 22 to display the operation status display screen D (step Sa7). The notification control section 44 repeats such generation and transmission of display data until entry of the vehicle 2 into the parking space is completed (step Sa8: No). Thus, the operation status display screen D is sequentially updated and displayed on the smartphone 22.

Thereafter, when the automated entry of the vehicle 2 into the parking space is completed (step Sa8: Yes), the information sharing control section 46 determines whether or not a sharing command is received from the smartphone 22 (step Sa9). When a sharing command is received (step Sa9: Yes), the information sharing control section 46 transmits a position of the parking space to an electronic mail account or an SNS app account of a sharing-destination user (step Sa10). Thus, the sharing-destination user acquires, through an electronic mail or the SNS app, the position of the parking space entered by the vehicle 2 through the automated entry, and can grasp the position of the parking space.

Figure 4:
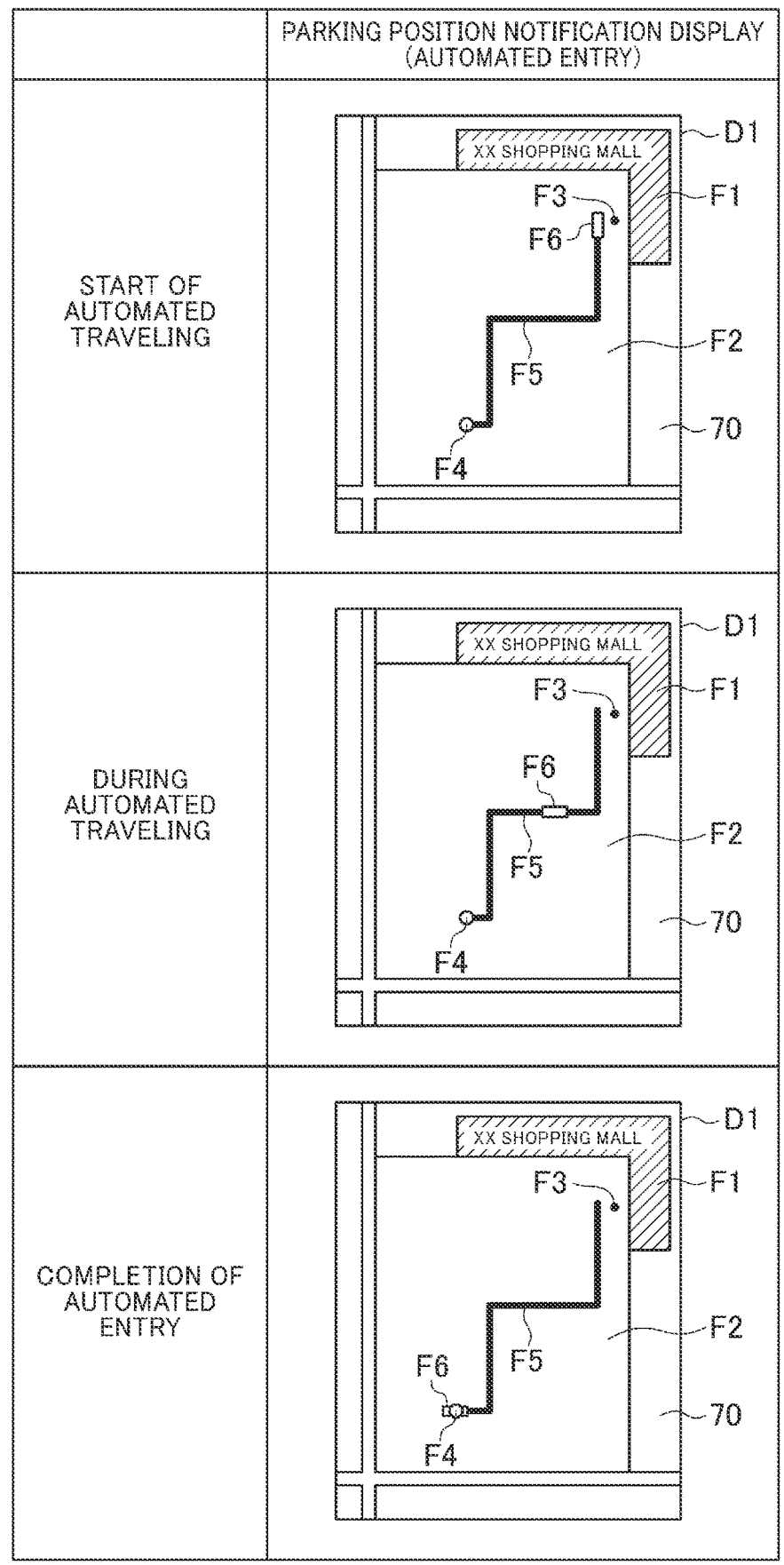
FIG. 4 shows display examples of a parking position notification display in the operation status display screen.

FIG. 4 schematically shows display examples of the parking position notification display D1 in the operation status display screen D. Note that FIG. 4 shows a case of notifying a status of automated entry of the vehicle 2 to the user by using the map 70.

In the parking position notification display D1, a drop-off position F3, a parking space position F4 set by the parking space setting section 40, a traveling route F5 by automated traveling, and a vehicle icon F6 indicating a current position of the vehicle 2 are displayed, in a superimposed manner, on the map 70 including a parking space of a facility F1 ("XX SHOPPING MALL" in the examples shown) that the vehicle 2 has entered. Information related to a vehicle direction (yawing angle) and a traveling direction may be added to the vehicle icon F6.

In the present embodiment, at the automated parking processing apparatus 10, the display data generation section 56 of the notification control section 44 generates an image in which the drop-off position F3, the parking space position F4, and the like are superimposed on the map 70, and transmits display data including the image to the smartphone 22. The smartphone 22 then displays the image in an area of the parking position notification display D1 in the operation status display screen D.

Here, a position of the smartphone 22 at a time of displaying the parking position notification display D1 may be displayed in the parking position notification display D1, instead of, or along with, the drop-off position F3.

Specifically, the smartphone 22 detects the own position, for example, by using a GPS receiver that receives a GPS signal, and transmits the position of the smartphone 22 to the automated parking processing apparatus 10.

At the automated parking processing apparatus 10, the display data generation section 56 generates an image in which the drop-off position F3 or/and the position of the smartphone 22, and the parking space position F4 are superimposed on the map 70, and transmits display data including the image to the smartphone 22.

Note that in place of the display data generation section 56, the smartphone 22 may generate an image in which the drop-off position F3, the parking space position F4, and the like are superimposed on the map 70.

In such a case, the display data generation section 56 transmits data on the map 70 and data including each of information on the drop-off position F3, information on the parking space position F4, information on the traveling route F5, and information on the current position of the vehicle 2 to the smartphone 22 via the communication unit 21. The smartphone 22 generates an image in which the drop-off position F3, the parking space position F4, and the like are superimposed on the map 70, based on the information included in the data.

When the parking position notification display D1 includes the position of the smartphone 22, the smartphone 22 may generate an image in which the position of the smartphone 22 is superimposed on the map 70, based on the data and own position information detected by the smartphone 22. Thus, the automated parking processing apparatus 10 does not need to acquire the position information on the smartphone 22 from the smartphone 22, for the parking position notification display D1.

As shown in FIG. 4, in the parking position notification display D1, the vehicle icon F6 moves with automated traveling of the vehicle 2, and it is displayed where on the traveling route F5 the vehicle 2 is traveling (a status of automated traveling). When automated entry into the parking space is completed, the parking position notification display D1, in which the vehicle icon F6 coincides with the parking space position F4, displays a status where the vehicle 2 has entered the parking space position F4.

When the switch button D3 (FIG. 2) is operated by the user in the operation status display screen D and a switching command based on the operation is received by the notification control section 44, display data in which the map 70 is switched to the aerial photograph 72 in the parking position notification display D1 is displayed on the smartphone 22.

Figure 5:
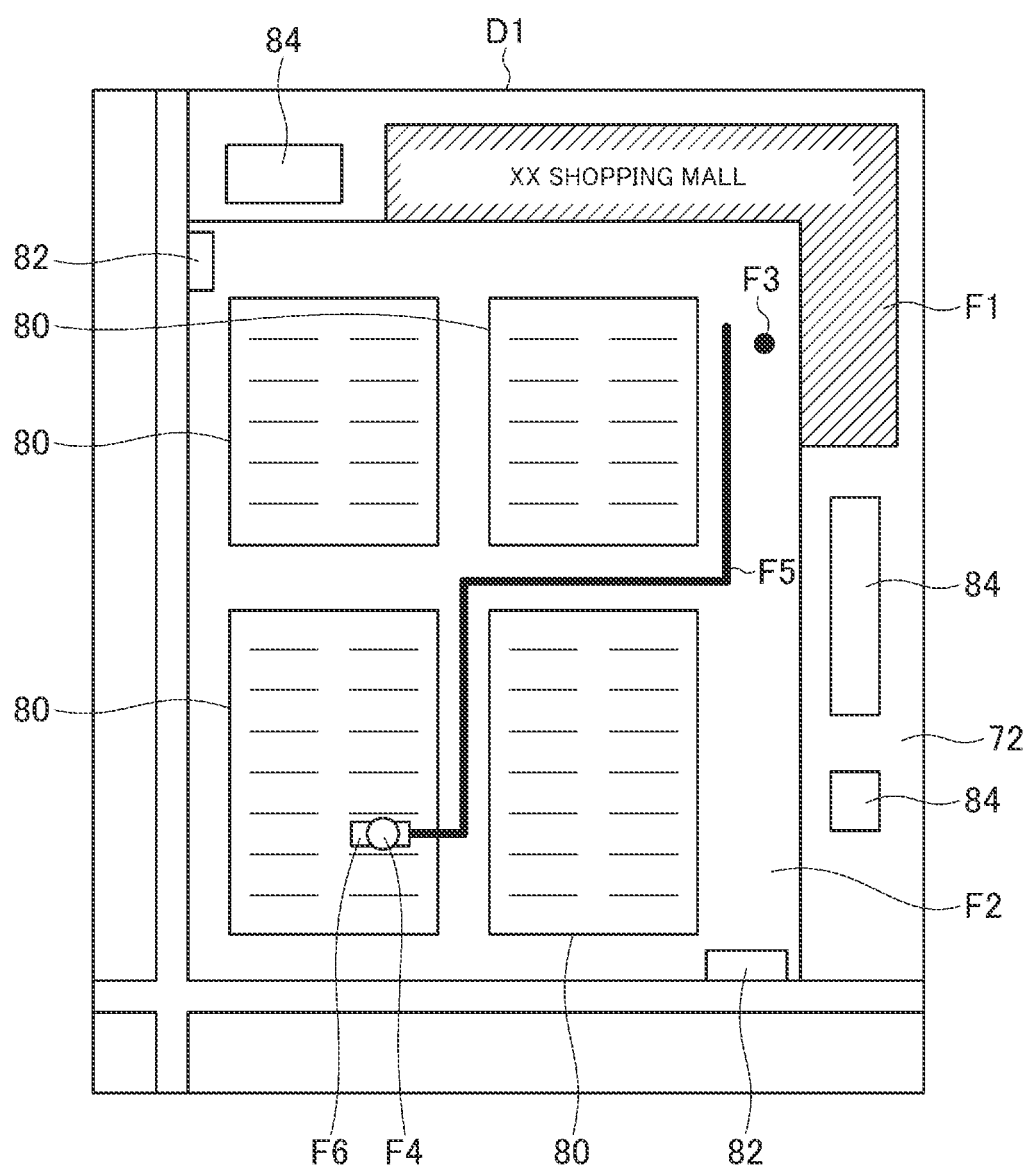
FIG. 5 schematically shows another display example of the parking position notification display in the operation status display screen.

FIG. 5 schematically shows a display example of the parking position notification display D1 in the operation status display screen D. FIG. 5 shows a case of notifying a status of automated entry of the vehicle 2 to the user by using the aerial photograph 72.

The aerial photograph 72 shows various objects that are not displayed in an ordinary map, such as parking compartment lines 80 in the parking lot F2, entrance and exit gates 82, and various buildings 84 adjacent to the parking lot F2.

Since the drop-off position F3, the parking space position F4, the traveling route F5, and the vehicle icon F6 are displayed, in a superimposed manner, on the aerial photograph 72, the user who is present in the parking lot F2 can more accurately grasp the drop-off position F3, the parking space position F4, and a position of the traveling route F5 by comparing a scenery around with the aerial photograph 72.

Moreover, by displaying the position of the smartphone 22 in the parking position notification display D1 instead of, or along with, the drop-off position F3 as described above, the user can easily grasp a relative positional relationship between the position of the parking space for the vehicle 2 and the smartphone 22 carried by the user.

Note that when the information sharing control section 46 transmits the position of the parking space to an electronic mail account or an SNS app account of a sharing-destination user, the image data on the parking position notification display D1 as described above may be transmitted, in place of information (longitude and latitude information) on the position of the parking space.

When the automated parking processing apparatus 10 causes the vehicle 2 to perform automated leaving of the parking space and automated traveling to the drop-off position, the display data generation section 56 of the notification control section 44 also generates display data on the operation status display screen D, transmits the display data to the smartphone 22, and thus causes the smartphone 22 to display the operation status display screen D similar to the operation status display screen D at the time of the automated entry.

According to the above-described embodiment, following effects are obtained.

The automated parking processing apparatus 10 in the present embodiment causes the display 22B of the smartphone 22 carried by the user to display the position of the parking space entered by the vehicle 2 through automated entry, and the drop-off position F3 or/and the position of the smartphone 22, in a superimposing manner on the map 70 including the parking space.

The automated parking processing apparatus 10 in the present embodiment causes the display 22B of the smartphone 22 carried by the user to display the parking position notification display D1 in which the position of the parking space entered by the vehicle 2 through automated entry, and the drop-off position F3 or/and the position of the smartphone 22 are superimposed on the aerial photograph 72 showing the parking space.

Accordingly, even if the parking lot is so large that it is difficult to grasp the parking space, or even if so many vehicles are parked in the parking lot that it is difficult to find the own vehicle 2, the user can easily grasp the relative positional relationship between the parking space and the drop-off position F3, by having a look at the parking position notification display D1. Thus, the user can easily find an actual position of the parking space entered by the vehicle 2.

Moreover, the position of the smartphone 22 is displayed in the parking position notification display D1 instead of, or along with, the drop-off position F3, whereby even when the user is in a building such as the shopping mall and it is therefore difficult for the user to directly see the vehicle, the user can easily grasp the relative positional relationship between the parking space and the smartphone 22 carried by the user, by having a look at the parking position notification display D1.

Accordingly, in a scenario where the user places goods purchased at the facility in the vehicle and then goes to the facility again for shopping or the like, the user can personally go to and smoothly arrive at the vehicle 2, without bothering to cause the vehicle 2 to perform automated leaving.

By using the aerial photograph 72, the user who is present in the parking lot F2 can more accurately grasp the drop-off position F3, the parking space position F4, and the position of the traveling route F5, by comparing a scenery around with the aerial photograph 72.

Since the automated parking processing apparatus 10 in the present embodiment causes the traveling route F5 of the vehicle 2 by automated traveling to be displayed in a manner of being superimposed on the map 70 or the aerial photograph 72, it is easier to grasp an actual position of the parking space entered by the vehicle 2.

Since the automated parking processing apparatus 10 in the present embodiment causes the smartphone 22 to display a traveling distance and a traveling duration traveled by the vehicle 2 in the automated traveling together with the parking position notification display D1, the user can grasp a sense of a distance of the traveling route F5 from the drop-off position to the parking space, based on the traveling distance and the traveling duration.

The automated parking processing apparatus 10 in the present embodiment allows information on the position of the parking space entered by the vehicle 2 through automated entry to be transmitted to and shared with another user.

Thus, the user can notify the position of the parking space to not only another user who is an occupant of the vehicle 2, but also a person who is not an occupant, so that such other users can smoothly arrive at the vehicle 2. Accordingly, the user can meet another user at the vehicle 2 that has entered (is parked in) a parking space, or can lend the vehicle 2 that has entered a parking space to another user, without accompanying the another user.

The above-described embodiment only illustrates one aspect of the present invention, and modifications and applications can be made arbitrarily without departing from the gist of the present invention.

In the above-described embodiment, the smartphone 22, not the automated parking processing apparatus 10, may acquire, from the map delivery server 6, and display the map 70 or the aerial photograph 72 for the parking position notification display D1.

In the above-described embodiment, only any one of the traveling distance and the traveling duration traveled by the vehicle 2 in the automated traveling may be displayed in the automated traveling information display D2 of the operation status display screen D.

In the above-described embodiment, a route length of the traveling route F5 and cardinal points may be displayed in the parking position notification display D1 of the operation status display screen D.

The map 70 or the aerial photograph 72 may include at least the parking space and the drop-off position, or the parking space and the position of the smartphone 22, and it may be arbitrarily set how far surroundings of the parking space are included.

A map and an aerial photograph that show the surroundings of the parking space in an enlarging manner may be displayed as appropriate in the parking position notification display D1.

Blocks depicted in FIG. 1 are a schematic diagram in which components are classified according to contents of main processing and shown, to facilitate understanding of the invention of the present application. The components can be further classified into more components according to contents of processing. Such classification is also possible that one component executes more processing.

In FIG. 1, the automated parking processing apparatus 10 may integrally include the communication unit 21, the surroundings detection sensor 24, the camera 26, the position detection unit 27, the vehicle control unit 29, and the like, as one unit.

REFERENCE SIGNS LIST

1 Automated parking system (in-vehicle processing system)
2 Vehicle
6 Map delivery server
10 Automated parking processing apparatus (in-vehicle processing apparatus)
21 Communication unit
22 Smartphone (portable electronic device)
40 Parking space setting section
42 Automated valet parking control section
44 Notification control section
46 Information sharing control section
70 Map
72 Aerial photograph
D Operation status display screen
D1 Parking position notification display
D2 Automated traveling information display
D3 Switch button
D4 Share button
F2 Parking lot
F3 Drop-off position
F4 Parking space position
F5 Traveling route
F6 Vehicle icon

What is claimed is:

1. An in-vehicle processing apparatus comprising:
a processor that executes control of causing a vehicle to perform automated traveling from a drop-off position where a user gets off the vehicle to a parking space and causing the vehicle to perform automated entry into the parking space,
wherein the processor
receives an automated entry command to start the automated entry, sets a position of the parking space, and sets a traveling route between the drop-off position of the user and the parking space,
generates control information for the automated traveling and the automated entry, based on the traveling route that is set, and starts the automated traveling of the vehicle from the drop-off position to the parking space based on the generated control information, and
causes a portable electronic device carried by a user to display a parking position notification display in which an operation status display screen that displays an operation status of the automated traveling, the position of the parking space, and the drop-off position are superimposed on a map or an aerial photograph.

2. The in-vehicle processing apparatus according to claim 1, wherein the processor causes the portable electronic device to display at least one of a traveling distance and a traveling duration traveled by the vehicle in the automated traveling, together with the parking position notification display in which the position of the parking space entered by the vehicle through the automated entry and the drop-off position are superimposed on the image.

3. The in-vehicle processing apparatus according to claim 1, wherein the processor allows information on the position of the parking space to be shared with another user.

4. An in-vehicle processing system, comprising:
a communication circuit that communicates with a portable electronic device carried by a user; and
an in-vehicle processing apparatus comprising a processor that executes control of causing a vehicle to perform automated traveling from a drop-off position where a user gets off the vehicle to a parking space and causing the vehicle to perform automated entry into the parking space,
wherein the processor
receives an automated entry command to start the automated entry, sets a position of the parking space, and sets a traveling route between the drop-off position of the user and the parking space,
generates control information for the automated traveling and the automated entry, based on the traveling route that is set, and starts the automated traveling of the vehicle from the drop-off position to the parking space based on the generated control information, and
causes a portable electronic device carried by a user to display a parking position notification display in which an operation status display screen that displays an operation status of the automated traveling, the position of the parking space, and the drop-off position are superimposed on a map or an aerial photograph.

* * * * *